dig
UNITED STATES PATENT OFFICE.

HENRY NOEL POTTER, OF NEW ROCHELLE, NEW YORK, ASSIGNOR TO GEO. WESTING-HOUSE, OF PITTSBURG, PENNSYLVANIA.

ART OF PRODUCING SILICON MONOXID.

No. 875,286.　　　Specification of Letters Patent.　　　Patented Dec. 31, 1907.

Application filed June 14, 1905. Serial No. 265,204.

*To all whom it may concern:*

Be it known that I, HENRY NOEL POTTER, a citizen of the United States, and resident of New Rochelle, county of Westchester, State of New York, have invented certain new and useful Improvements in the Art of Producing Silicon Monoxid, of which the following is a specification.

The process of producing silicon monoxid by heating silicon dioxid to a critical temperature in the presence of carbon is described in my application for Letters Patent of the United States filed December 30, 1904, Serial Number 238,925, the process therein described involving the idea of removing one oxygen atom from the dioxid of silicon, thereby producing silicon monoxid. The theory upon which the process rests is that the two atoms of oxygen in $SiO_2$ molecule, analogously to $CO_2$, are not attached with equal strength and that in reducing the dioxid, one of the oxygen atoms comes off easier than the other, so that there is a tendency to use up all the reducing agent by reducing the $SiO_2$ to SiO rather than for some of the reducing agent to remove the second oxygen atom, namely that in the SiO, liberating Si.

The present process differs from that described in my application mentioned, although it involves a similar theory as to the relative degree of attachment of the oxygen atoms in the $SiO_2$ molecule. I have found if crystalline metallic silicon is piled about a graphite core in a vacuum furnace from which the air is partially pumped that on passing an electric current through the core and heating the same sufficiently a brown powder having the characteristics of the powder described in my application Number 238,925 is deposited on the walls of the furnace. This shows that when silicon is oxidized it takes oxygen in two steps, first to SiO, which is the only product that will be formed provided an insufficient quantity of oxygen be present. Presumably, under ideal conditions the Si will wholly change to SiO before any of the SiO is oxidized to $SiO_2$. The same result may be obtained by heating the silicon, which is an electrical conductor, by passing a current directly through it so that, instead of surrounding the core with silicon, we can use silicon as the resistance between suitable electrodes composed of carbon or massive silicon, and produce the monoxid by keeping the supply of oxygen under such pressure and control as is best suited to carrying out the process.

The action on which the successful operation of the process appears to depend is that silicon be heated in the presence of oxygen under such conditions of oxygen supply and pressure as to prevent the oxidation to the dioxid. This implied an incomplete combustion of silicon as a feature of the process of producing monoxid of silicon. In other words, to put the matter in another way, it may be briefly said that silicon monoxid is in the present process produced by highly heating silicon in air under reduced pressure or under conditions which preclude the rapid oxidation which takes place when oxygen is present in large quantities. Under conditions then in which silicon is highly heated in the presence of an atmosphere poor in oxygen, we may produce silicon monoxid. When the silicon thus heated is in vaporous form the resulting product appears in the form of a powder as described in my previous application.

To render the atmosphere in which the heating takes place poor in oxygen, the supply may be cut down as already stated, by reducing the pressure or it may also be cut down by diluting the normal atmosphere with large quantities of an inert gas, such as nitrogen or CO.

I claim as my invention:—

1. The process of producing silicon monoxid, which consists in causing an incomplete combustion of metallic silicon.

2. The process of producing silicon monoxid, which consists in heating silicon in the presence of oxygen under such conditions of oxygen supply as to prevent the oxidation to the dioxid.

3. The method of producing silicon monoxid, which consists in highly heating metallic silicon in air under reduced pressure.

4. The method of producing silicon monoxid, which consists in highly heating silicon in an atmosphere poor in oxygen.

5. The method of making a pulverulent compound containing monoxid of silicon, which consists in burning the vapor of silicon with oxygen insufficient to produce the dioxid.

6. The method of making a pulverulent compound containing monoxid of silicon, which consists in heating the vapor of silicon in an atmosphere poor in oxygen.

7. The method of making a pulverulent compound containing monoxid of silicon, which consists in highly heating silicon vapor in air under reduced pressure.

Signed at New York, in the county of New York, and State of New York, this 9th day of June A. D. 1905.

HENRY NOEL POTTER.

Witnesses:
WM. H. CAPEL,
GEORGE H. STOCKBRIDGE